UNITED STATES PATENT OFFICE.

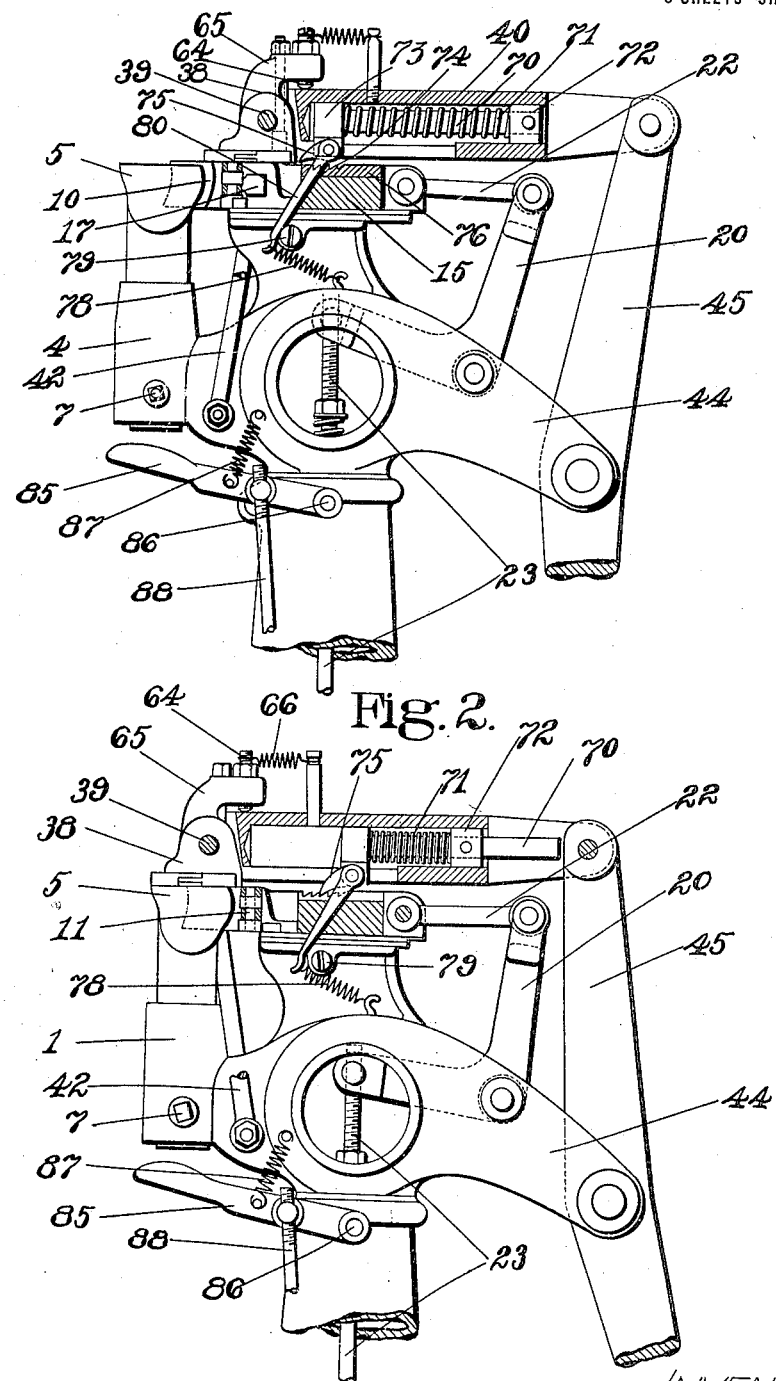

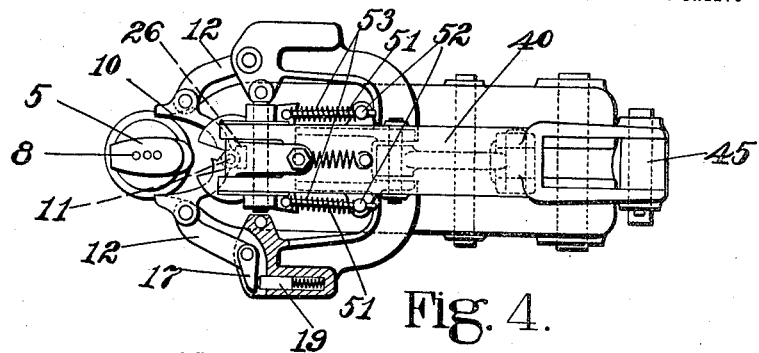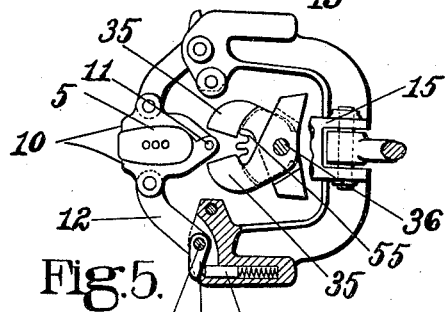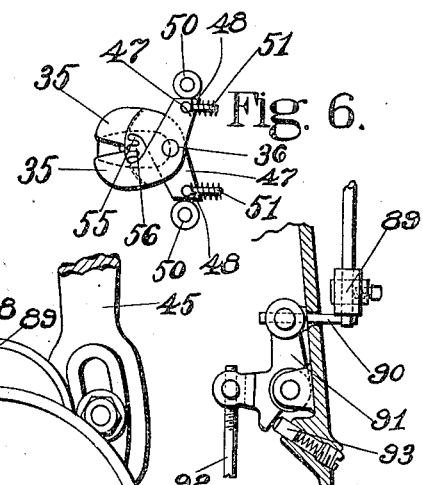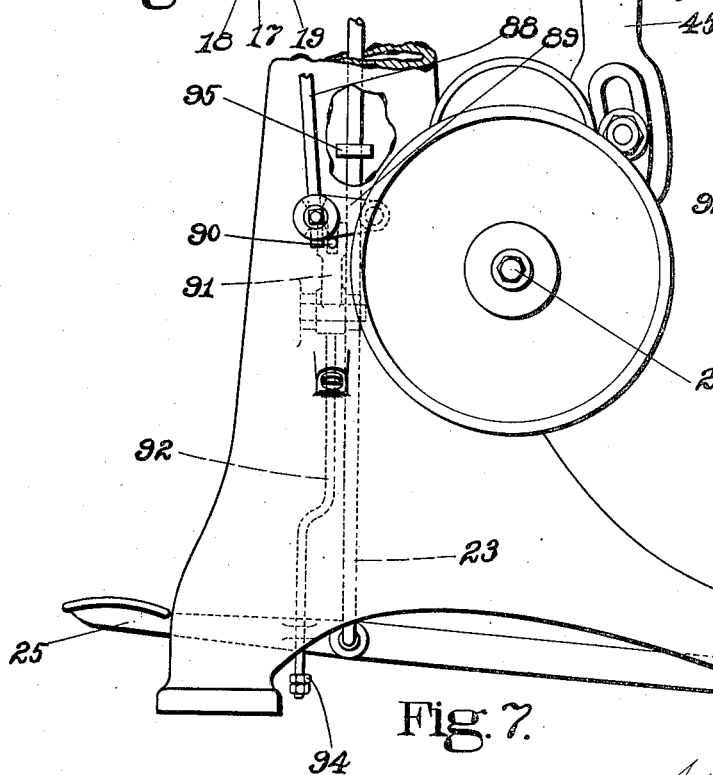

ARTHUR BATES, OF LEICESTER, ENGLAND, ASSIGNOR, BY MESNE ASSIGNMENTS, TO UNITED SHOE MACHINERY CORPORATION, OF PATERSON, NEW JERSEY, A CORPORATION OF NEW JERSEY.

SHOE-UPPER-SHAPING MACHINE.

1,312,470.          Specification of Letters Patent.        Patented Aug. 5, 1919.

Application filed March 30, 1915. Serial No. 18,026.

*To all whom it may concern:*

Be it known that I, ARTHUR BATES, a subject of the King of England, residing at Leicester, Leicestershire, England, have invented certain Improvements in Shoe-Upper-Shaping Machines, of which the following description, in connection with the accompanying drawings, is a specification, like reference characters on the drawings indicating like parts in the several figures.

The invention relates to machines for shaping uppers and is herein shown for illustrative purposes as embodied in a machine for molding the heel portions of boot and shoe uppers.

A feature of the invention is a machine for shaping an end portion of a shoe upper that comprises novel means for wiping the margin of the upper inwardly and for compressing it progressively as it is overwiped, the construction shown comprising a mold which in its operative relation to other parts of the machine is essentially the equivalent of a last, a wiper and supporting means arranged to position it initially above the plane of the tread face of the mold and to maintain it continuously in substantially uniform angular relation to said plane, and operating means coöperating with said supporting means to move the wiper bodily inward over the mold with a component of movement at right angles to said inward movement to cause the wiper to compress the stock upon the tread face of the mold as it is moved over the same so that the wiper has a combined wiping and compressing action. In the illustrated embodiment of this feature of the invention the wiper is carried by a member that is supported on a substantially parallel linkage so arranged that as the said member is moved in a direction to cause the wiper to wipe the margin of the upper it will have a component of movement at right angles to the said direction so as to force the wiper toward the said tread face and compress the margin of the upper against the same.

Another feature of the invention is a machine for shaping an end portion of an upper of a boot or shoe that comprises a mold and a wiper for wiping the margin of the upper over the tread face of said mold with novel controlling means whereby the wiper is permitted to adjust itself in response to resistance of the shoe materials, the construction shown comprising a wiper mounted to tip about an axis that is arranged transversely of the mold and substantially opposite to and parallel with said tread face. By this arrangement the wiper will seat itself irrespective of variations in thickness of the inturned margin of the upper and insure even pressure thereon. As herein shown the wiper is secured to a pivoted member that is yieldingly held in predetermined initial position by a spring and an adjustable or other abutment. In the illustrative construction the overwiping operation is performed by end embracing wipers, and the invention presents novelty also in provision for controlling wipers of this type to permit adjustment in response to resistance of the shoe materials.

A further feature of the invention consists in a machine for shaping the heel ends of boot and shoe uppers that comprises the combination with an inner mold or last and an outer mold or heel clamping means, of mechanism by which said parts are first moved relatively by a treadle or the like to clamp the work between them and are then operated by power means to augment the pressure on the work. As shown in the drawings the outer mold is operatively connected with a mechanism by which a wiper plate is moved over and toward the tread face of the molds and the connections are so constructed and arranged that the pressure of the outer mold on the work reaches its maximum as the wiper reaches the limit of its compressing movement. In the illustrated construction the arrangement is such that during the return movement of the wiper the pressure effected by the molds is gradually reduced and finally withdrawn.

These and other features of this invention, including certain details of construction and combinations of parts will appear more fully from the following description of an illustrative embodiment of the invention, considered in connection with the accompanying drawings, and will then be pointed out in the claims.

Figure 1 of the drawings is a side elevation of the illustrative machine which is constructed and arranged for shaping the heel end portions of boot and shoe uppers;

Figs. 2 and 3 are views similar to the upper part of Fig. 1, with portions in section, the parts in Fig. 2 being in the position in which the machine is inoperative while in Fig. 3 they are in the position they assume when the molding operation is being effected;

Fig. 4 is a plan of the parts of the machine shown in Fig. 2, and with the said parts in the same position;

Fig. 5 is a plan similar to a part of Fig. 4 but showing the molds which act on the outside of the shoe closed in upon the inner mold which receives the shoe;

Fig. 6 is a plan of a wiper with its associated parts employed in the machine to fold in and compress the edges of the upper;

Fig. 7 is a side elevation of the lower portion of the machine showing means by which the power applied to the machine is controlled; and Fig. 8 is a section, at right angles to Fig. 7, of a portion of the mechanism comprised in that figure.

Figure 1:
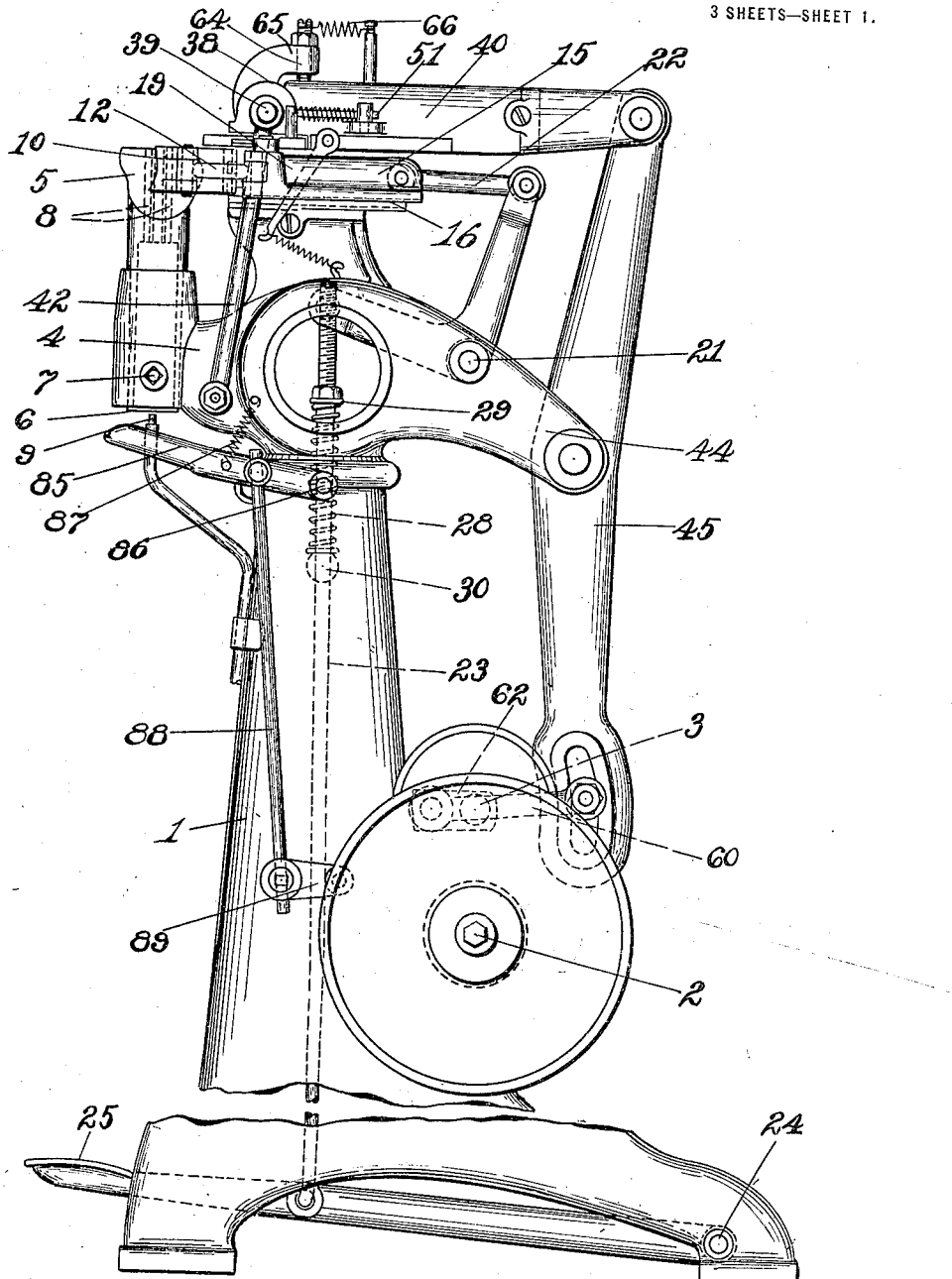

The machine comprises a frame 1 which stands on the floor and carries in bearings a main shaft 2 and a countershaft 3. Above these shafts the frame has a forwardly projecting part 4 which carries an inner mold 5 upon which the upper to be molded can be placed. The inner mold preferably has mounted in the projecting part 4 a depending support in the form of a stem 6 which is received in a bore in the said part 4 of the frame and fastened in vertically adjusted position by a fixing screw 7. If desired the inner mold can, instead of being fixed in the projecting part of the frame, be yieldingly supported therein by a spring which is provided for the purpose, for example by encircling the stem and bearing at its opposite ends against collars in the bore and on the stem. Means are provided for heating the inner mold as for example a gas burner 9, see Fig. 1, supported on the frame beneath the stem 6 of the inner mold, the stem being made hollow and provided with passages 8 extending to its upper or tread surface.

The outer mold comprises two members 10, 10 which coöperate with the inner mold 5 in molding the upper, are pivoted together at 11, and are connected at their forward ends by two links 12 to two arms projecting from a mold carrying slide 15 movable in guideways 16 in the frame. Each link 12 has a spring-controlled connection, Figs. 4 and 5, with its associated arm formed by providing a portion 17 of the link extending beyond its point of connection 18 with the arm, the said portion being borne upon by a spring plunger 19 located in a bore in the arm.

The slide 15 is moved in its guideways 16 to press the outer molds 10 against the upper by a bell-crank lever 20 having a fixed pivot at 21, the upper or vertical arm of the said lever being connected with the slide 15 by a link 22 while the lower or horizontal arm is connected by a rod 23 with a treadle 25 pivoted at 24. When the machine is in inoperative position, that is with the treadle raised and the slide 15 retracted, the outer molds rest against a fixed stop 26, Fig. 4, in contact with which they are maintained by the spring plungers 19 hereinbefore mentioned. When the treadle is depressed and the bell-crank lever 20 turned the slide 15 is moved forward in its guideways 16 and, owing to the action of the spring plungers 19, the outer molds 10 are first closed together and then moved forward whereby first a wiping action and then a pressing action is imparted to the sides of the upper. The treadle normally is kept in its raised position and the slide 15 retracted by a spring 28 which surrounds the treadle rod and bears at its upper end against a collar 29 on the same while its lower end rests on a lug 30 fixed on the standard through which lug the treadle rod passes.

Overwiping means which preferably comprises two wipers 35 pivoted together at 36 and adapted to be closed together as hereinafter described, is provided in the machine to bear upon the marginal portions of the upper above the molds.

The wipers are mounted, as hereinafter described, in a member 38 that is pivoted at 39 to a wiper carrying member 40 capable of movement backward and forward above the slide 15. This movement of the wiper carrier 40 is obtained by mounting it on links 42 connecting its forward end with the machine standard to which the said links are pivoted, while the rear end of the said carrier is supported by a lever 45 extending in substantially parallel relation to the links 42 and pivoted between lugs 44 projecting from the machine standard. In the forward and backward movement of the carrier it will follow a curvilinear path in which the carrier 40 is sustained continuously for movement in substantially parallel relation to and above the plane of the tread face of the mold, because it moves on the links 42 and the end of the lever 45 which constitutes an additional supporting link. This will result in the wipers having a combined wiping and pressing effect on the edges of the upper.

To close the wiper members 35, 35 together so that they may move inwardly over the edges of the upper during the advance movement of the carrier 40, the said members are each provided with a tail piece 47 having an end surface 48. This surface is adapted to contact with a roller 50, centered on the slide 15 as the wiper is moved forward, the combined inward movement of the tails of the two members causing their front portions to move toward each other with a scissor-like action. To open out the wiper members on the back stroke of the carrier 40 each tail piece is provided with a sliding rod 51 (Fig. 4) which passes through a stud 52 and is surrounded by a spring 53 which is in compression between the tail piece and the stud. The overwiping means is also provided with a member 55 adapted to bear on the rear edge of the upper during the advance movement and said member 55 has an opening approximately conforming to the shape of the rear part of the heel seat but preferably with a projection 56 extending centrally into the said opening.

The lever 45 is operated by a link 60 adjustably connecting its lower end with a crank 62 on the countershaft 3, which latter is driven by gearing from the main shaft 2 of the machine. The main shaft is driven through a single revolution clutch of any well known type. The gearing between the shafts 2 and 3 is so arranged that the countershaft 3 makes half a revolution to a complete rotation of the main shaft 2.

The wipers preferably are mounted in the pivoted member 38 by the stem 36 which forms the pivot of the members 35, 35, the said stem projecting upward and engaging in a bore in the member 38. The stem is retained in the bore by a nut screwed on its upper end which is threaded for this purpose.

The pivoted member 38 is provided with a tail piece 65 through which a screw 64 is threaded, the end of the said screw being normally held against the carrier 40 by a spring 66. By turning the screw 64, the initial angular disposition of the wipers can be adjusted, while the spring 66 will permit them to turn on the center 39, which is between the front and rear ends of the wipers, in accordance with variation of the thickness of the turned over edges of the upper.

In order that additional pressure shall be applied by power to the outer molds 10 after the latter have been moved forward by operation of the treadle 25, means are provided for coupling together the carrier 40 and the slide 15 so that the latter will be operated as the wipers are advanced over the inturned edges of the upper. With this purpose in view the carrier 40 is provided with a longitudinal rod 70 encircled by a spring 71 which bears at one end against a collar 72 secured within the carrier 40 and through which the rod 70 can slide. The other end of the spring 71 bears against a head 73 formed on the end of the rod 70 and on this head is pivoted a pawl 75 which is adapted at times to engage any one of a series of teeth 74 formed on a plate 76 secured to the slide 15 operating the outer molds. When the machine is in inoperative position the pawl 75 is held from engagement with the teeth 74 by a stud 79 against which a spring 78 holds an arm 80 secured to the pawl 75, the spring 78 preferably being connected with the arm 80 at one end and with a hook on the frame at the other. When the carrier 40 is moved forward and the arm 80 thus drawn away from the stud 79 the spring 78 will cause the pawl 75 to be turned so as to engage the teeth 74.

The operation of the machine as thus far described is as follows:

The heel end of an upper is placed upon the heated inner mold 5 and the treadle 25 then depressed. Through the bell-crank lever 20 the outer molds 10 are closed together, and moved forwardly, and during this forward movement the teeth 74 on the plate 76 secured to the slide 15 are moved under the pawl 75. The clutch controlling the driving shaft 2 is then tripped (as will afterward be explained either by the operation of a hand lever 85 or by a continued action of the treadle 25) whereupon the countershaft 3 through the gearing will be turned through half a revolution. This semi-rotation of the countershaft through the crank 62, lever 45, and carrier 40, causes the wipers to engage the upper above the top face of the inner mold 5 and to wipe over and gradually compress the margin of the upper. In this forward movement of the wipers the arm 80 of the pawl 75 is moved from the stud 79 and the spring 78 causes the pawl to engage the teeth so that as the slide 15 is moved forward the spring 71 surrounding the rod 70 is compressed and the pressure of the outer molds on the upper is increased in accordance with such compression of the spring 71.

When the clutch is again tripped the wiper is drawn backward thereby gradually reducing the compression of the spring 71 and correspondingly removing the pressure of the outer molds from the upper.

As has already been indicated, the clutch can be operated by a hand lever. Preferably the hand lever 85 is pivoted at 86 on the machine standard and is held upward by a spring 87 joining the lever and the frame as shown in Figs. 1 and 2. From the lever 85 a rod 88 extends downward and is connected with a trip lever 89 which is centered on the frame and operates the clutch in the usual manner. Preferably means are also provided, as shown in Figs. 7 and 8, to prevent the hand lever 85 from being operated before the treadle 25 has been depressed, and these means may comprise a pin 90 which normally obtrudes in the path of the trip lever 89. The pin is connected with one arm of a bell-crank lever 91 the other arm of which is connected by a link 92 with the treadle 25 through a lost motion connection 94. The bell-crank lever 91 is acted upon by a spring plunger 93 which holds it normally in such position that the pin 90 protrudes. After the lost motion has been taken up by the preliminary movement of the treadle 25 in bringing the outer molds into position, further movement of the treadle will turn the bell-crank lever 91 and remove the pin 90 from beneath the trip lever whereupon the hand lever can be operated and the power applied to the machine.

Alternatively, the clutch can be tripped by a continued action of the treadle 25 instead of by the operation of a separate lever. For this purpose the trip lever 89 is connected by the rod 23 with the treadle, the said rod passing through a lug on the lever and being provided with a head or an adjustable nut 95, Fig. 7, at some distance from the lug. This forms a lost motion connection between the treadle and the trip lever so that after the treadle has been operated to advance the outer molds as already described further movement of the treadle will cause the head or nut to be engaged by the lug and the clutch to be tripped whereby the power will be applied to the machine.

Having explained the nature of this invention and described an illustrative embodiment thereof, I claim as new and desire to secure by Letters Patent of the United States:—

1. A machine for shaping an end portion of a shoe upper having, in combination, a mold, a wiper sustained for movement with the wiper continuously in substantially uniform angular relation to and above the plane of the tread face of the mold to wipe the margin of the upper over the tread face of the mold, and operating means for the wiper that cause it to move from a normal elevated relation to the mold downwardly, toward the said tread face as it is moved over the same so that the wiper has a combined wiping and compressing action.

2. A machine for shaping an end portion of a shoe upper having, in combination, a mold, end embracing wipers, a wiper carrier sustained for movement with the wipers continuously in substantially uniform angular relation to the plane of the tread face of the mold and with their overwiping faces initially opposite to said plane; and means for bodily moving said carrier and wipers lengthwise of the mold to overwipe the upper and for coincidently imparting to the carrier a component of movement substantially at right angles to said lengthwise movement to cause the wipers to compress upon the tread face of the mold the margin of the upper being overwiped.

3. A machine for shaping an end portion of a shoe upper having in combination a mold, a wiper, means for advancing the wiper, and parallel linkage supporting the wiper and arranged to give to the wiper a component of movement at right angles to its direction of wiping movement to compress upon the tread face of the mold the margin of the upper progressively as it is overwiped.

4. A machine for shaping an end portion of a shoe upper having in combination a mold, end embracing wipers, a wiper carrier, links supporting the carrier near the wipers, a lever having an arm substantially parallel with the links and supporting the carrier at a point remote from the wipers, operating means to advance the wipers, and means to close the wipers as they are advanced.

5. A machine for shaping an end portion of a shoe upper having in combination a heel mold, a frame in which the mold is carried, heel wipers, a carrier, linkage connecting the carrier to the frame with the wipers normally retracted from the mold and raised slightly above the plane of the tread face of the mold, and operating means for advancing the carrier and causing it to be forced by said linkage toward the plane of the tread face of the mold.

6. A machine for shaping an end portion of a shoe upper having in combination end embracing wipers, means to advance and close the wipers to wipe an end portion of the upper toward lasted position, and means organized to force the wipers toward the tread face of the shoe responsively to their advancing movement.

7. A machine for shaping an end portion of a shoe upper having in combination a mold, a wiper to lay the upper over the tread face of the mold, and a wiper carrier in which the wiper is mounted to turn about an axis extending laterally of the mold and located opposite to and substantially parallel with the tread face of the mold.

8. A machine for shaping an end portion of a shoe upper having in combination end embracing wipers, a wiper carrier, and a pivoted connection between the wipers and the carrier located between the front and rear ends of the wipers and permitting the wipers to seat themselves irrespective of variations in thickness of the overwiped margin of the upper engaged by the front and rear portions of the wipers.

9. A machine for shaping an end portion of a shoe upper having in combination end embracing wipers, a wiper carrier, a pivoted connection between the wipers and the carrier located between the front and rear ends of the wipers to permit the wipers to tip about an axis extending laterally of the shoe, and means for yieldingly holding the wipers in a predetermined initial position relatively to said axis.

10. A machine for shaping an end portion of a shoe upper having in combination a mold, a wiper to lay the upper over the tread face of the mold, a wiper carrier in which the wiper is mounted to turn about an axis extending laterally of the mold and located opposite to and substantially parallel with the tread face of the mold, means to advance the wiper over the tread face of the mold and to depress the wiper during its advance, and means to hold the wiper yieldingly with its leading end tipped up about said axis as it advances.

11. A machine for shaping an end portion of a shoe upper having in combination an inner mold and an outer mold, manually operated means for relatively moving said molds to clamp the work between them, and power operated means to augment the pressure of the molds on the work.

12. A machine for shaping an end portion of a shoe upper having in combination an inner mold and an outer mold, operating mechanism including a treadle by which said molds are first moved relatively to clamp the work between them, and power driven means to which the molds are then connected to augment the pressure on the work.

13. A machine for shaping an end portion of a shoe upper having in combination an inner mold and an outer mold, and operating mechanism including power driven means for applying final pressure and manual means for initially moving the molds relatively to clamp the work, said mechanism being organized to prevent starting of the power driven means until after the initial clamping of the work by the manual means.

14. A machine for shaping an end portion of a shoe upper having in combination an inner mold and an outer mold, and operating mechanism including power driven means for applying final pressure and manual means for initially moving the molds relatively to clamp the work, said manual means including a device which prevents starting of the power driven means until after the operation of the manual means has been performed.

15. A machine for shaping an end portion of a shoe upper having in combination an inner mold and an outer mold, a treadle for initially operating said molds relatively to clamp the work, power operated mechanism to which the outer molds may be connected to apply additional pressure to the work, a controlling lever for the power mechanism and a stop normally in the path of the controller and arranged to be withdrawn therefrom by movement of said treadle.

16. A machine for shaping an end portion of a shoe upper having in combination end wipers, means to embrace the end portion of the shoe below the wipers, means to close said embracing means, means to advance the wipers, and connections becoming operative during the advance of the wipers by which the wiper advancing means applies further closing pressure to the end embracing means.

17. A machine for shaping an end portion of a shoe upper having in combination end wipers, means to embrace the end portion of the shoe below the wipers, means to close said embracing means, means to advance the wipers, and connections normally held inoperative and caused to become operative at a predetermined point in the advance of the wipers to cause the wiper advancing means to pick up the said closing means and yieldingly apply additional closing pressure.

18. A machine for shaping an end portion of a shoe upper having in combination heel wipers, a heel clamp, manually operated means for closing the clamp, power operated mechanism for the wipers, and connections through which said power operated mechanism effects additional closing pressure on the clamp.

19. A machine for shaping an end portion of a shoe upper having in combination heel wipers, a heel clamp, means for closing the clamp, operating mechanism for the wipers, and connections through which said mechanism effects additional closing pressure on the clamp, said connections including a spring which is compressed during advance of the wipers and maintains the clamp closed during retraction of the wipers.

20. A machine for shaping an end portion of a shoe upper having in combination end wipers, an end clamp, means for closing the clamp, mechanism arranged for subsequent operation for advancing the wipers, and a pawl and ratchet and spring connection from said mechanism to said means by which additional clamp closing pressure is applied when the wipers are advanced.

21. A machine for shaping an end portion of a shoe upper having in combination a wiper, an end clamp, means for closing the clamp, and mechanism arranged for subsequent operation to advance and depress the wiper to fold and compress the stock and which is operatively connected with the clamp so that the pressure of the clamp on the work reaches its maximum as the wiper reaches the limit of its compressing movement.

22. A machine for shaping an end portion of a shoe upper having in combination, an inside heel mold, an outer mold, means for closing the outer mold, heel wipers, mechanism for advancing the wipers, and connections therefrom for applying augmented pressure to the outer mold, said connections being constructed and arranged to cause the pressure of the outer mold to be reduced gradually during the return movement of the wipers and finally to be withdrawn.

23. A machine for shaping an end portion of a shoe upper having in combination with suitable operating mechanism, heel embracing wipers comprising pivotally connected side members and an intermediate member having an operative edge conforming approximately to the shape of the rear part of the heel seat and provided with a projection extending centrally over the heel seat.

24. A machine for shaping an end portion of a shoe upper having in combination end embracing wipers provided with tail pieces which cross each other and are pivotally connected and have end faces, relatively fixed rollers, means acting through said pivotal connection to advance the wipers and cause said end faces to move relatively to the rollers and close the wipers, and springs connected with said tail pieces and arranged to open the wipers when they are retracted.

25. A machine for shaping an end portion of a shoe upper having in combination a heel embracing clamp, an operating slide therefor, levers connecting opposite side portions of the clamp with adjacent side portions of the slide, springs acting on the levers at the outer sides of their connections with the slide to turn the levers in the direction to hold the side portions of the clamp normally closed yieldingly toward each other, and means to advance the slide and cause the clamp to wipe forwardly as it embraces a heel.

26. A machine for shaping an end portion of a shoe upper having in combination a heel embracing clamp, an operating slide therefor, levers connecting opposite side portions of the clamp with adjacent side portions of the slide, springs acting on the levers at the outer sides of their connections with the slide to turn the levers in the direction to hold the side portions of the clamp normally closed yieldingly toward each other, means for retracting the slide and clamp, and a stop arranged to be engaged by the middle portion of the clamp before the retractive movement is completed and to cause the clamp to be opened against the resistance of said springs by pull transmitted through said levers to the side portions of the clamp.

27. A machine for shaping an end portion of a shoe upper having in combination an inside heel mold, an outside mold comprising members hinged together at their rear ends, an operating slide, links pivotally connecting said members and the slide, spring plungers mounted in the slide and engaging the links beyond their points of pivotal connection with the slide and operating to hold the mold members yieldingly pressed together, and means for advancing the slide and the outside mold to effect first a wiping and then a pressing action of the mold on the upper carried by the inside mold.

28. A machine for shaping an end portion of a shoe upper having in combination an inside heel mold, an outer mold comprising connected members, and supporting and operating means for said connected members constructed and arranged to cause them to effect first a forward wiping action and then a clamping action on the heel portion of an upper carried by the inside mold.

29. A machine for shaping an end portion of a shoe upper having in combination a frame, means carried by the frame to support the heel portion of a shoe upper and means also carried by the frame to clamp the heel portion of the upper around said support, an end wiper mechanism supported above the frame, and means to impart to said mechanism a movement of the wiper downwardly and simultaneously forwardly over the support to fold and compress the margin of the upper upon the tread face of the support.

30. A machine for shaping an end portion of a shoe upper having in combination an inner heel mold, an outer heel mold, heel embracing wipers, and mechanism for relatively operating said molds and wipers to shape the heel portion of an upper, said inner mold having a tubular stem open at its lower end and being provided with passages extending from said stem to the tread face of the mold, and a gas burner arranged adjacent to the lower end of the stem to direct heated products of combustion through said stem and passages to heat the inner mold.

31. A machine for shaping an end portion of a shoe upper having, in combination, an inner mold having a depending support, an outer mold, flange forming means, mechanism for relatively operating said molds and flange forming means to shape the end portion of an upper to the side faces of said inner mold and over the margin of the tread face of said inner mold, said inner mold being provided with a heat conducting passage extending from the lower end of its support to the tread face of said mold and heat supplying means arranged in relation to the lower end of said support to direct a heating medium up said passage.

32. In a machine of the class described, the combination with shoe positioning means, of end embracing wipers, operating means for moving said wipers lengthwise of the shoe, said wipers being pivotally connected to said operating means for swinging movement relatively to said means about an axis extending laterally of the shoe, and yielding means tending to oppose such swinging movement of the wipers while permitting them to swing in response to resistance of the shoe materials.

33. In a machine of the class described, the combination with shoe positioning means, of end embracing wipers, said wipers being mounted to swing in response to resistance of the shoe materials about an axis extending laterally of the shoe, spring means tending to oppose said swinging movement of the wipers, and means for adjustably determining the normal position in which the wipers are held by said spring means.

34. In a machine of the class described, the combination with shoe positioning means, of end embracing wipers, operating means comprising substantially parallel links to move said wipers lengthwise of the shoe while tending to maintain them in substantially uniform angular relation to the plane of the shoe bottom, said wipers being mounted to swing relatively to said operating means about an axis extending laterally of the shoe in response to resistance of the shoe materials, and spring means tending to resist said swinging movement of the wipers.

35. In a machine of the class described, the combination with shoe positioning means, of end embracing wipers, means for moving said wipers lengthwise of the shoe and for closing them inwardly over the shoe bottom, and wiper positioning means constructed and arranged to position the wipers with their front ends inclined away from the plane of the shoe bottom as the wipers are advanced while permitting the wipers to tip yieldingly in response to resistance of the shoe materials into position to seat themselves evenly upon the overwiped margin of the upper.

36. In a machine of the class described, the combination with shoe positioning means, of end embracing wipers, and wiper supporting and operating means constructed and arranged to position the wipers initially with their overwiping faces opposite to the plane of the shoe bottom and to move them lengthwise of the shoe with a component movement substantially at right angles to said lengthwise movement to cause the wipers to approach the plane of the shoe bottom continuously as they wipe the margin of the upper inwardly and to subject said margin to a progressively increasing pressure throughout the overwiping operation.

37. In a machine of the class described, the combination with shoe positioning means, of clamping means constructed and arranged to embrace the end of the shoe on its lateral periphery, manual means for operating said clamping means initially to apply it to the shoe, and power operated means for subsequently operating said clamping means to increase the clamping pressure.

In testimony whereof I have signed my name to this specification in the presence of two subscribing witnesses.

ARTHUR BATES.

Witnesses:
  FREDERICK WILLIAM WORTH,
  CECIL HERBERT CROSS.

Copies of this patent may be obtained for five cents each, by addressing the "Commissioner of Patents, Washington, D. C."